United States Patent
Stinnett

(10) Patent No.: US 10,567,094 B2
(45) Date of Patent: Feb. 18, 2020

(54) SYSTEM AND METHOD FOR CHARACTERIZING RADIO AND ANTENNA PERFORMANCE USING RSS MEASUREMENTS

(71) Applicant: DENSO International America, Inc., Southfield, MI (US)

(72) Inventor: Joe Stinnett, Carlsbad, CA (US)

(73) Assignee: DENSO International America, Inc., Southfield, MI (US)

(*) Notice: Subject to any disclaimer, the term of this patent is extended or adjusted under 35 U.S.C. 154(b) by 0 days.

(21) Appl. No.: 15/922,173

(22) Filed: Mar. 15, 2018

(65) Prior Publication Data

US 2019/0044629 A1 Feb. 7, 2019

Related U.S. Application Data

(60) Provisional application No. 62/539,600, filed on Aug. 1, 2017.

(51) Int. Cl.
| | | |
|---|---|---|
| *H04B 17/318* | (2015.01) | |
| *H01Q 1/32* | (2006.01) | |
| *H04W 4/46* | (2018.01) | |
| *H04W 4/38* | (2018.01) | |

(52) U.S. Cl.
CPC ......... *H04B 17/318* (2015.01); *H01Q 1/3216* (2013.01); *H01Q 1/3225* (2013.01); *H04W 4/46* (2018.02); *H01Q 1/3275* (2013.01); *H04W 4/38* (2018.02)

(58) Field of Classification Search
None
See application file for complete search history.

(56) References Cited

U.S. PATENT DOCUMENTS

| | | | |
|---|---|---|---|
| 6,622,013 B1* | 9/2003 | Miyoshi ................. | H04B 7/086 455/273 |
| 9,379,828 B2 | 6/2016 | Banasky, Jr. | |
| 2010/0120415 A1* | 5/2010 | Urquhart .............. | H01Q 1/1257 455/424 |
| 2017/0067950 A1* | 3/2017 | Patel ...................... | G01R 29/10 |
| 2018/0212667 A1* | 7/2018 | Chen .................... | H04B 17/318 |

* cited by examiner

*Primary Examiner* — Anh Ngoc M Nguyen
(74) *Attorney, Agent, or Firm* — Harness, Dickey & Pierce, P.L.C.

(57) ABSTRACT

A communications system for a vehicle includes an antenna mounted on a vehicle and configured to communicate with a plurality of remote units. A diagnostic controller is configured to detect obstacles or damage to the antenna. The diagnostic controller is configured to receive remote messages, measure a receive signal strength of the remote messages, and determine a ratio of low receive signal strength sample messages to total sample messages. The diagnostics controller is further configured to trigger a diagnostic output to the vehicle when the ratio is greater than a predetermined threshold.

20 Claims, 6 Drawing Sheets

SYSTEM AND METHOD FOR CHARACTERIZING RADIO AND ANTENNA PERFORMANCE USING RSS MEASUREMENTS

CROSS-REFERENCE TO RELATED APPLICATIONS

This application claims the benefit of U.S. Provisional Application No. 62/539,600, filed on Aug. 1, 2017. The entire disclosure of the above application is incorporated herein by reference.

FIELD

The present disclosure relates to vehicle communication systems and, more specifically, to a system and method for characterizing vehicle radio and antenna performance using receive signal strength (RSS) measurements.

BACKGROUND

This section provides background information related to the present disclosure which is not necessarily prior art.

Vehicle to vehicle (V2V), vehicle to infrastructure (V2I), vehicle-to-pedestrian (V2P), vehicle-to-network (V2N), collectively referred to as vehicle-to-everything (V2X), technology relies on vehicles transmitting Basic Safety Messages (BSMs) over a vehicle communications radio, for example a dedicated short range communications (DSRC) radio, a cellular-V2X (C-V2X) radio, or any other communications radio, to all other surrounding vehicles in the vicinity. The SAE J2945/1 document defines the rules to be used when transmitting BSMs. Message reception is critical to the operation of V2V/V2X safety applications that will leverage information within the transmitted BSMs to determine if a collision is imminent. In DSRC systems, for example, the messages are sent and received using 5.9 GHz DSRC communications which are sent through a 5.9 GHz DSRC antenna. In C-V2X based systems, the message are sent and received using 5G C-V2X communications sent through a cellular antenna. Currently, failure modes caused by antenna or cable physical damage can be detected using simple short circuit or open circuit electrical measurements. However, other types of failures, such as radio failure, partial or complete signal blockage, or partial antenna damage (for example a bent antenna), are not currently diagnosed.

SUMMARY

This section provides a general summary of the disclosure, and is not a comprehensive disclosure of its full scope or all of its features.

A communications system of the present disclosure includes an antenna and a diagnostic controller. The antenna is mounted on a vehicle and configured to communicate with a plurality of remote units. The diagnostic controller is configured to detect obstacles or damage to the antenna. The diagnostic controller is configured to receive remote messages sent from the plurality of remote units, measure a receive signal strength of the remote messages, and determine a ratio of low receive signal strength sample messages to total sample messages. The diagnostics controller is further configured to trigger a diagnostic output to the vehicle when the ratio is greater than a predetermined threshold The communications system of the present disclosure wherein the diagnostic controller may include a remote message receiving unit that determines a number of active remote units within a predetermined range based on global positioning system coordinates of the remote units transmitted through the remote messages.

The communications system of the present disclosure wherein the diagnostic controller may include a remote message filter unit that discards the remote message if a range of the remote message is greater than a predetermined threshold, and a remote message receiving unit that determines the range of the remote message based on global positioning system coordinates of the remote unit transmitted through the remote message.

The communications system of the present disclosure, wherein the diagnostic controller may include a data determination unit that determines a transmit power, the receive signal strength, an azimuth angle of the remote message, and a message sorting unit that sorts the remote message into one of a plurality of bins representing a segment of 360 degrees surrounding the antenna.

The communications system of the present disclosure, wherein the diagnostic controller may include a data determination unit that determines the receive signal strength and a minimum receive signal strength for the remote message, and a failure determination unit that compares the receive signal strength with the minimum receive signal strength, increments the low receive signal strength sample messages if the receive signal strength is less than the minimum receive signal strength, and increments the total sample messages.

The communications system of the present disclosure, wherein the diagnostic output may be at least one of a visual display, an audible alarm, and an electronic message.

The communications system of the present disclosure, wherein the remote message may be a basic safety message.

Another embodiment of a diagnostics system of the present disclosure is configured to detect obstacles or damage to a communications antenna on a vehicle. The diagnostics system includes a remote message receiving unit, a data determination unit, and a failure determination unit. The remote message receiving unit is configured to receive messages from a plurality of remote units. The data determination unit is configured to measure a receive signal strength of each message and determine a ratio of low receive signal strength sample messages to total sample messages. The failure determination unit is configured to trigger a diagnostic output when the ratio is greater than a predetermined threshold.

The remote message receiving unit may be configured to determine a number of active remote units within a predetermined range based on global positioning system coordinates of the remote units transmitted through each message.

The diagnostics system may further include a remote message filter unit configured to discard the message if a range of the message is greater than a predetermined threshold, wherein the remote message receiving unit is configured to determine the range of the message based on global positioning system coordinates of the remote unit transmitted through the message.

The data determination unit may be configured to determine a transmit power, the receive signal strength, and an azimuth angle of the message. A message sorting unit may be configured to sort the message into one of a plurality of bins representing a segment of 360 degrees surrounding a communication antenna.

The data determination unit may be configured to determine the receive signal strength and a minimum receive signal strength for the message. The failure determination unit may be configured to compare the receive signal strength with the minimum receive signal strength, increment a low receive signal strength sample messages counter if the receive signal strength is less than the minimum receive signal strength, and increment a total sample messages counter.

The diagnostic output may be at least one of a visual display, an audible alarm, and an electronic message.

The message may be a basic safety message.

A method for determining an integrity of a communications antenna on a vehicle according to the present disclosure includes receiving, by a remote message receiving unit, a remote message sent by a remote unit; measuring, by a data determination unit, a receive signal strength of the remote message; determining, by a data determination unit, a ratio of low receive signal strength sample messages to total sample messages; and triggering, by a failure determination unit, a diagnostic output when the ratio is greater than a predetermined threshold.

The method may further include determining, by the remote message receiving unit, a number of active remote units within a predetermined range based on global positioning system coordinates of the remote units transmitted through the remote messages.

The method may further include discarding, by a remote message filter unit, the remote message if a range of the remote message is greater than a predetermined threshold; and determining, by the remote message receiving unit, the range of the remote message based on global positioning system coordinates of the remote unit transmitted through the remote message.

The method may further include determining, by the data determination unit, a transmit power, the receive signal strength, and an azimuth angle of the remote message; and sorting, by a message sorting unit, the remote message into one of a plurality of bins representing a segment of 360 degrees surrounding the communication antenna.

The method may further include determining, by the data determination unit, the receive signal strength and a minimum receive signal strength for the remote message; comparing, by the failure determination unit, the receive signal strength with the minimum receive signal strength; incrementing, by the failure determination unit, the low receive signal strength sample messages if the receive signal strength is less than the minimum receive signal strength; and incrementing, by the failure determination unit, the total sample messages.

The method may further include triggering, by the failure determination unit, at least one of a visual display, an audible alarm, and an electronic message as the diagnostic output.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
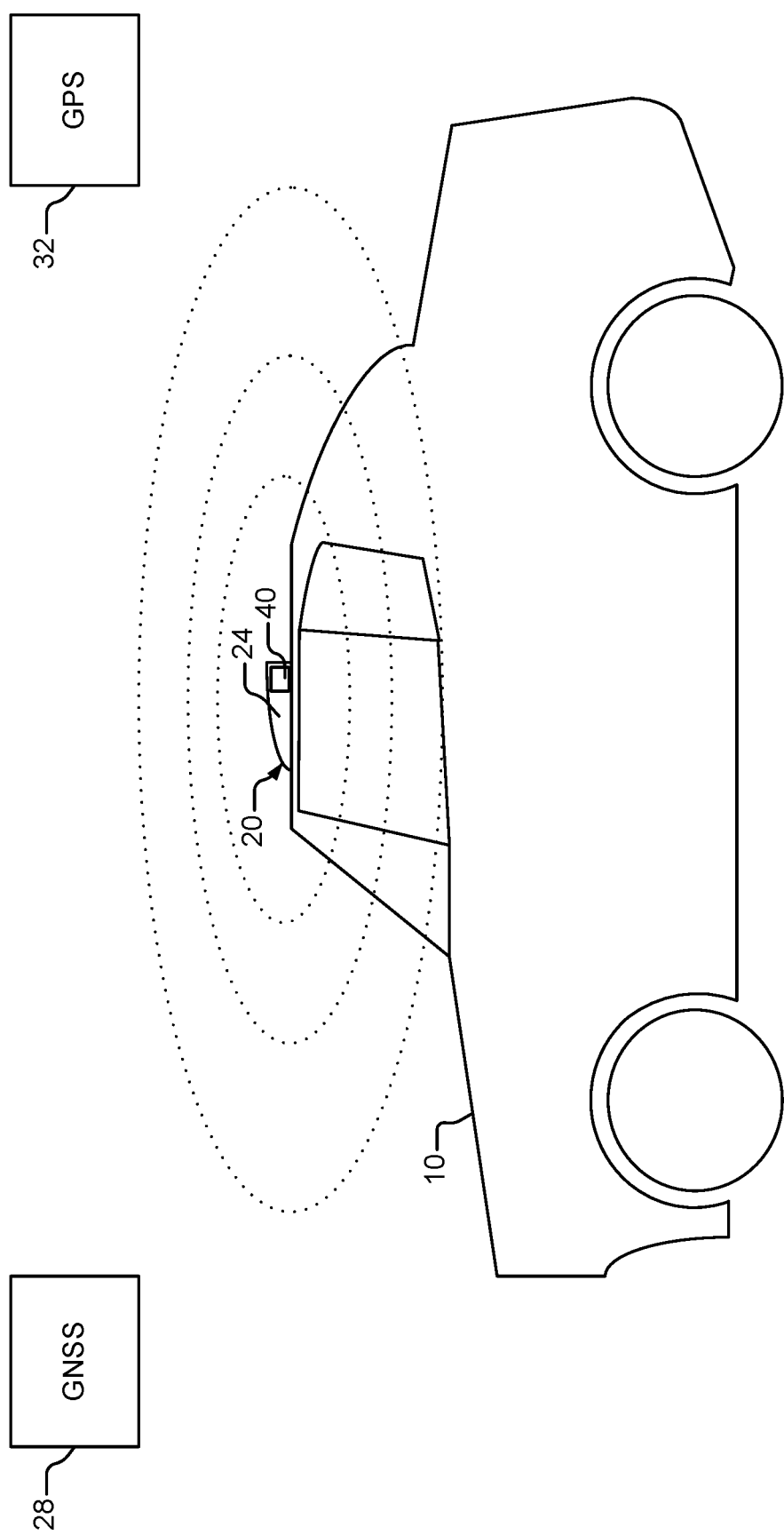
FIG. 1A is an illustration of a vehicle including a vehicle communications system.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A primary challenge with using a vehicle communication system, such as a 5.9 GHz Dedicated Short Range Communications (DSRCs) system or a Cellular-V2X (C-V2x) system, for vehicle-to-vehicle (V2V) or vehicle to infrastructure (V2I), collectively referred to as V2X, communications is maintaining high message reception rates with remote vehicles (RVs). Antennas are placed on the vehicle to ensure basic safety messages (BSMs) can be transmitted and received with optimal performance to support safety-of-life applications. Minimum transmit performance must be maintained according to federal regulation. Since the ideal location of the communications antenna is high on the vehicle body, this system component may be vulnerable to physical damage and blockages from foreign objects such as luggage on a roof rack. In the event that damage or obstruction degrades the wireless signal performance, the vehicle operator needs to be informed that the V2X system is degraded or unavailable.

While the communications antenna is illustrated and described as being disposed on a vehicle body, the present disclosure is applicable to V2X antennas on vehicles, infrastructure, or any other V2X antenna location. Additionally, while the antenna is described as communicating with a remote vehicle (RV), it is understood that this is for example purposes only and the antenna could be communicating with any remote message-sending antenna, including a remote infrastructure, a remote pedestrian, etc. For simplicity, the remote signal from the infrastructure, pedestrian, vehicle, or other remote signal will be represented by RV.

Currently, failure modes caused by antenna or cable physical damage can be detected using simple short circuit or open circuit electrical measurements. However, other types of failures, such as radio failure, partial or complete signal blockage, or partial damage (for example a bent antenna), are not currently diagnosed because they are more difficult to diagnose using these traditional methods. The disclosure herein proposes a system and method that leverages RV wireless data to characterize the communications radio performance and self-diagnose issues stemming from obstructions or damage that is not readily detected using traditional methods. With sufficient V2V/V2X market penetration, the system and method could replace antenna and radio diagnostic circuitry to reduce hardware component cost.

As will be further described in detail below, when two vehicle communications, such as DSRC or C-V2X, equipped vehicles are exchanging wireless messages at a particular transmit distance (for example only, 20 meters), with antenna(s) in direct line-of-sight, and with known transmit power, the messages will reach the receiver with predictable minimum receive signal strength (RSS) in dBm. While some diagnostic capability can be gained without knowing the power of the transmitter, the diagnostics are substantially improved if the optional transmit power field is populated in the BSM Wave Short Message (WSM) header transmitted by each vehicle. While it is true that not all RVs will be in direct line-of-sight with the host vehicle (HV), the system works on the premise that the majority of communication at short range (<50 meters) and with minimal relative elevation angle (<5 degrees) will have a high probability of being in line-of sight. This information can be used to characterize the communications radio in a deployment environment to allow self-diagnosis of antenna blockages or other component damage that hinders communication performance.

The system characterizes the radio performance by randomly capturing samples from RVs at varying distances and azimuth angles and comparing the measured RSS to values observed under normal, direct, line-of-sight conditions. The system tracks the total count of samples considered to have low RSS and compares the fraction of low RSS samples to a diagnostic threshold. The system can conceivably detect the location of an antenna obstruction on the vehicle body relative to the antenna by tracking the azimuth angle of each sample and categorizing the samples into categories or "bins."

Now, referring to FIG. 1A, a vehicle 10, or host vehicle (HV), having vehicle to vehicle (V2V), vehicle to infrastructure (V2I), vehicle to pedestrian (V2P), and vehicle to network (V2N), collectively referred to as vehicle to everything (V2X), safety technology is shown. In the example embodiment, a vehicle, or host vehicle, 10 is equipped with a vehicle communications system (for example only, a dedicated short range communication (DSRC) system or a cellular-V2X (C-V2X) system) 20. While the vehicle 10 is described as being equipped with a DSRC system or a C-V2X system, in other embodiments, the vehicle 10 may be equipped with any vehicle communications system utilizing an antenna for transmitting information.

The vehicle communications system 20 may be configured to transmit and receive signals representing, for example, early warnings of accidents and driving hazards to/from remote vehicles that are also equipped with V2X systems and/or to/from an infrastructure communication location equipped with a V2X system. Additionally, the vehicle communications system 20 may be configured to predict future accidents and driving hazards based on communication with remote vehicles and/or infrastructure communication locations that are also equipped with V2X systems by calculating the current and future positions of the vehicle 10.

The vehicle communications system 20 may include an antenna 24 (for example only, a 5.9 GHz DSRC antenna, a 5G cellular antenna, or any other communications antenna) which receives information from Global Network Satellite Systems (GNSS) 28 and/or Global Positioning Systems (GPS) 32, which communicate with the vehicle communications system 20, along with Basic Safety Messages (BSM) periodically transmitted by other vehicles, infrastructure, pedestrians, networks, etc., containing the current position, position accuracy, speed, heading, brake status, and other vehicle infrastructure, pedestrian, network, etc., information. The SAE J2735 document defines the BSMs that may be utilized and the frequency and power with which the BSMs are transmitted. With V2X technology, vehicles can have improved safety by knowing more about the other surrounding vehicles, infrastructure, pedestrians, etc.

The vehicle communications system 20 may communicate with the other vehicles, infrastructure, pedestrians, networks, etc., equipped with a V2X system, for example, through the antenna 24 by using, for example, a 75 MHz band around a 5.9 GHz signal. While a 75 MHz band around a 5.9 GHz signal is provided as an example embodiment, it is understood that the vehicle communications system 20 may communicate with the other vehicles, pedestrians, infrastructures, networks, etc., by any method including at signals other than the 5.9 GHz signal, such as with a 5G cellular signal or any other communications signal. All of the components of the vehicle communications system 20 may be located at one or multiple locations on the roof of the vehicle. Alternatively, some of the components may be located in the interior of the vehicle 10. While the vehicle communications system 20 is illustrated as being located on the roof of the vehicle 10, in some embodiments, the vehicle communications system 20, and any or all of its components, may be disposed at any location on the vehicle 10 to include the front, rear, sides, and internal to the vehicle 10.

Figure 1B:
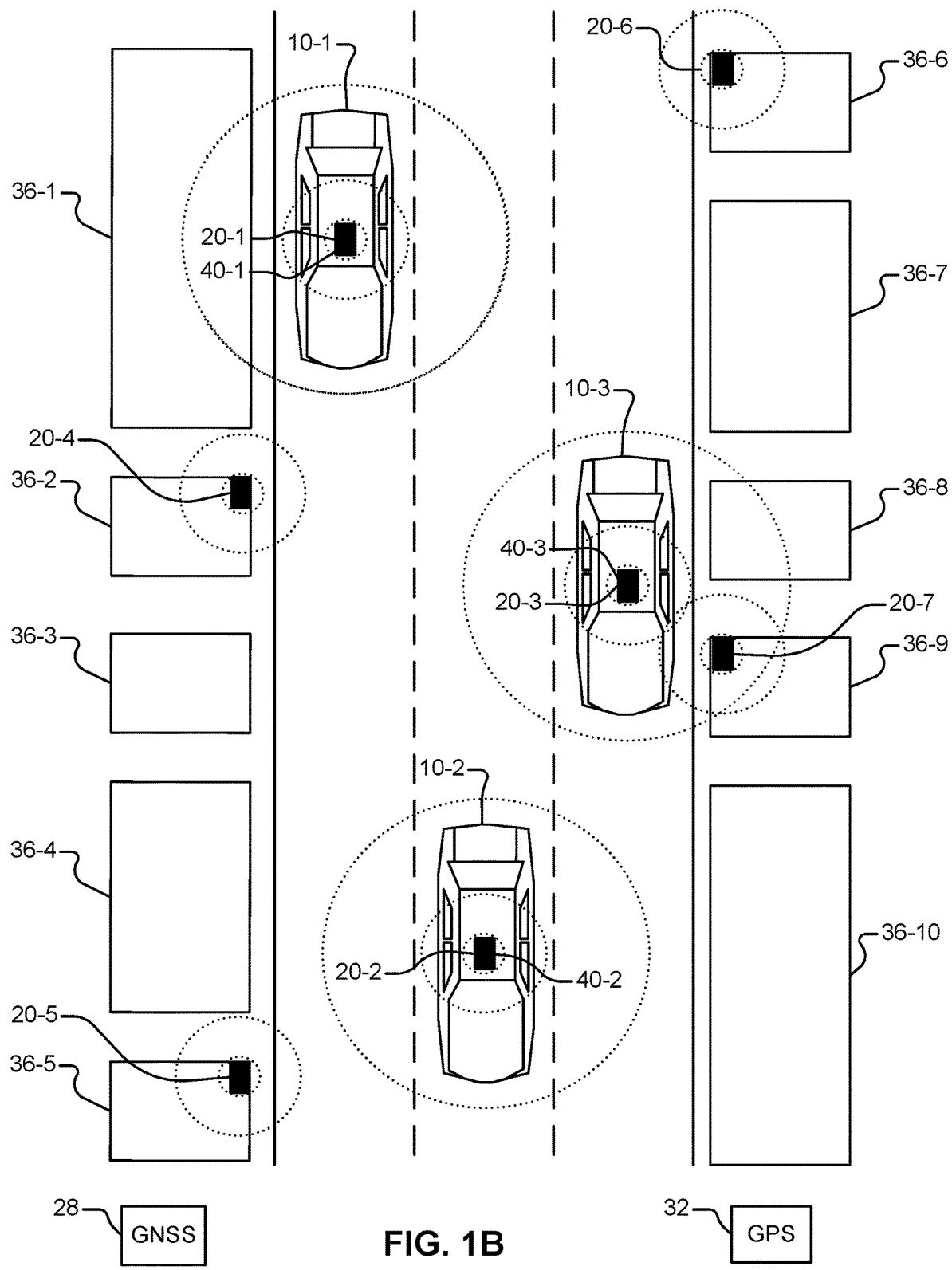
FIG. 1B is an illustration of several vehicles having vehicle communications systems in an urban environment.

With reference to FIG. 1B, a plurality of vehicles and infrastructure with V2X safety technology is shown. In the example embodiment, vehicles, or remote vehicles, 10-1, 10-2, 10-3 (collectively referred to as vehicles 10) are respectively equipped with communications systems, for example, DSRC or C-V2X systems, 20-1, 20-2, 20-3 (collectively referred to as vehicle communications systems 20). Infrastructures 36-1, 36-2, . . . , 36-10 (collectively referred to as infrastructures 36) may or may not include communications systems. For example, a portion of infrastructures 36 may include communications, such as DSRC or C-V2X, systems 20-4, 20-5, 20-6, 20-7 (included with the collective vehicle communications systems 20). The vehicle communications systems 20 may operate in both line-of-sight (LOS) and non-line-of-sight (NLOS) conditions, thereby allowing the vehicle communications systems 20 of the vehicles 10 and infrastructures 36 to communicate warnings and driving hazards, even with blockage from intervening vehicles, blind corners, or other roadside infrastructure. Signals from each of the vehicle communications systems 20 are illustrated radiating outward in a circular pattern, as indicated by dotted circles in FIG. 1B.

Referring additionally to FIG. 1A, the vehicle communications system 20 may additionally include a diagnostic system 40 (and 40-1, 40-2, 40-3, . . . in FIG. 1B) for determining the integrity of the antenna 24. Since, as shown in FIG. 1A, the ideal location of the antenna 24 is at the highest point on the vehicle body, the antenna 24 may be vulnerable to physical damage and blockages from foreign objects such as luggage on a roof rack. In the even that damage or obstruction degrades the wireless signal performance of the antenna 24, the vehicle operator needs to be informed that the V2X system is degraded or unavailable. The diagnostic system 40, as described below, is configured to detect the damage or obstruction and inform the vehicle operator.

Figure 2:
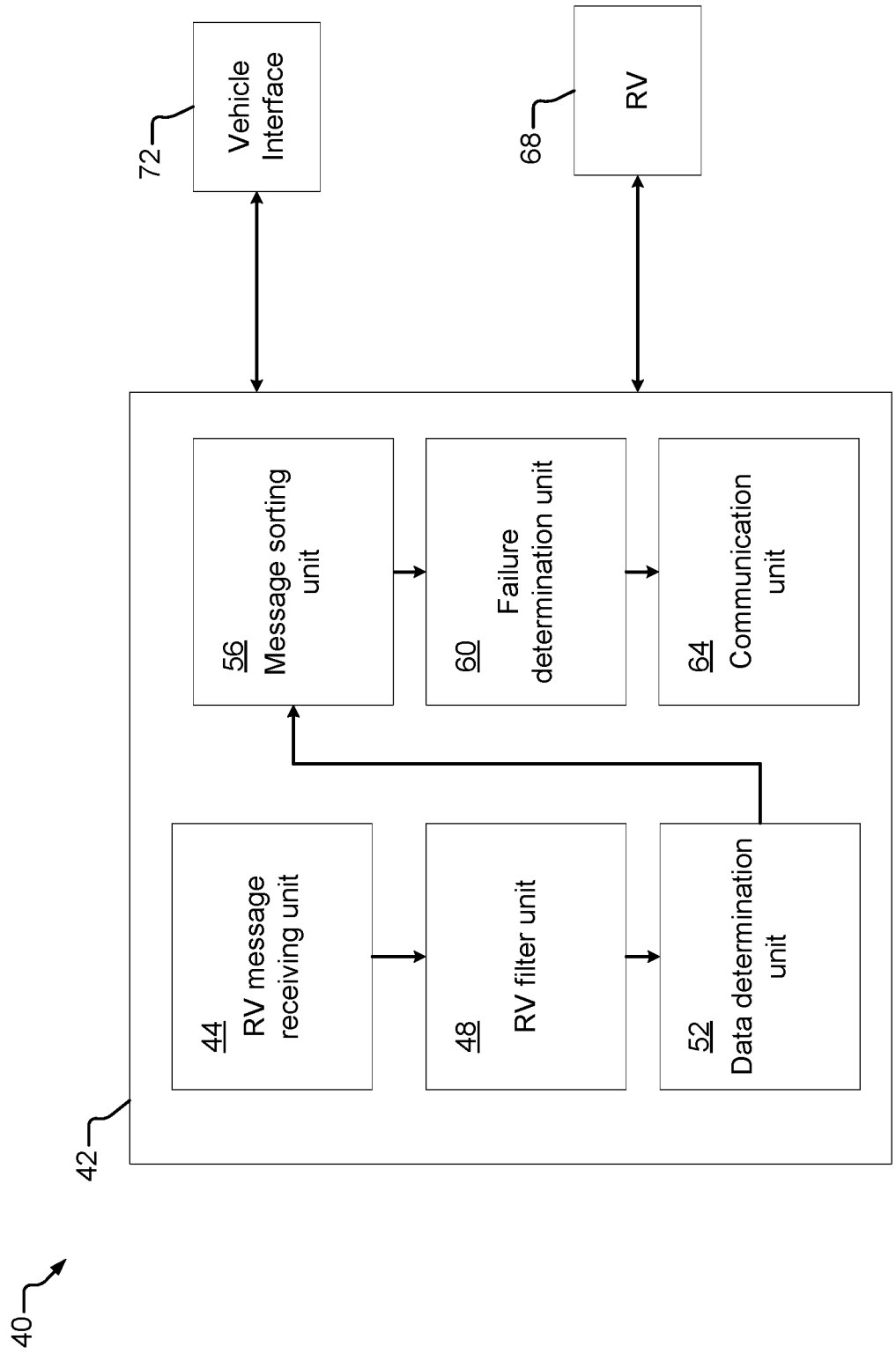
FIG. 2 is a block diagram of a diagnostic system according to the present teachings.

Now referring to FIG. 2, the diagnostic system 40 for the vehicle communications system 20 is illustrated. The diagnostic system 40 may include a diagnostic controller 42 having an RV message receiving unit, or remote message receiving unit, 44, an RV filter unit, or remote message filter unit, 48, a data determination unit 52, a message sorting unit 56, a failure determination unit 60, and a communication unit 64. The diagnostic system 40 may communicate with one or more RVs 68 (or, in some embodiments, infrastructures, pedestrians, networks, etc.) and a vehicle interface 72.

The RV message receiving unit, or remote message receiving unit, 44 receives a wireless message from the vehicle communications system 20-$n$ of the RV 68. The messages received by the RV message receiving unit 44 include, among other information, an identifier for the RV, for example, such as a randomized temporary identification number (that changes periodically to protect user privacy) or other identification, a GPS coordinate location for the RV, a power at which the message was transmitted, etc.

The RV message receiving unit 44 determines the number of active RVs in the area (for example, the number of active RVs within 50 m). The number of messages received from different vehicles (or, in some embodiments, infrastructure, pedestrians, networks, etc.) indicates the number of active RVs. It is ideal for the diagnostic system 40 to randomly sample messages from a group of vehicles, rather than sampling a number of messages from one or two vehicles. Randomly sampling messages from a group of vehicles provides a good indication of the diagnostics of the HV system. For example, if a number of messages from different vehicles indicate a failure, the diagnostic system 40 has more confidence in the existence of a failure than if a single RV sends multiple messages indicating a failure. In the single RV scenario, the RV may be experiencing a problem or there may be an obstruction between the HV and RV. These messages would then be false triggers for a failure of the HV vehicle communications system 20.

Additionally, randomly sampling messages from a group of vehicles prevents against cyber-attacks. If a cyber terrorist is sending bad messages, the diagnostic system 40 wants these bad messages to be an insignificant portion of the message samples considered. Thus, by sampling messages from a group of vehicles, instead of the one cyber terrorist, the bad message would be one compared to many good messages.

Thus, to ensure that the diagnostic system 40 randomly samples messages from a group of vehicles, rather than sampling a number of messages from one or two vehicles, the RV message receiving unit 44 compares the number of active RVs in the area to a threshold number. The threshold number may be, for example only, 5-10 vehicles within 50 meters (m). Only if there are more than the threshold number of RVs does the diagnostic system 40 proceed with diagnosis. If the number of RVs exceeds the threshold, the RV message receiving unit 44 communicates the randomly sampled messages to the RV filter unit 48.

The RV filter unit, or remote message filter unit, 48 communicates with the RV message receiving unit 44 to filter out various messages from the RV 68 if the RV 68 is not within a predetermined measurement range. The RV filter unit 48 determines the distance or range in meters from the HV to the RV. The distance or range is computed by comparing the GPS coordinates of the RV (provided in the message) with the GPS coordinates of the HV.

The RV filter unit 48 then compares the distance or range from the HV to the RV to a predetermined distance threshold. For example only, the predetermined distance threshold may be 50 meters (m). If the distance or range from the HV to the RV is greater than the predetermined distance threshold, the RV filter unit 48 may discard the message (i.e., filter the message out).

Some embodiments may utilize diversity antenna setups. Diversity antenna setups are utilized where a single antenna cannot provide 360 degree coverage around the vehicle. In these cases, one antenna may be provided near the front of the vehicle (for example, on a front of the roof of a vehicle) to cover the front portion of the vehicle and one antenna may be provided near the rear of the vehicle (for example, on a rear of the roof of the vehicle) to cover the rear portion of the vehicle. If the HV utilizes diversity antennas and a distance between the antennas is greater than a diversity threshold (for example only, 3 m), two different range values must be calculated because the low RSS measurements could differ between the two antennas.

Optionally, the RV filter unit 48 may also filter messages based on elevation angle. Filtering based on elevation angle eliminates vehicles that may be positioned on a different road (for example an overpass or an underpass) or not within the line-of-sight. The elevation angle may be computed by comparing the GPS coordinates of the RV (provided in the message) with the GPS coordinates of the HV.

The RV filter unit 48 then compares the elevation angle to a predetermined elevation threshold. For example only, the predetermined elevation threshold may be 5 degrees (°). If the elevation angle of the RV is greater than the predetermined elevation threshold, the RV filter unit 48 may discard the message (i.e., filter the message out).

The RV filter unit 48 communicates any remaining messages to the data determination unit 52. The data determination unit 52 determines or computes additional data elements such as, for example, transmit power, receive signal strength (RSS), and azimuth angle. To determine transmit power, the data determination unit 52 searches and locates the transmit power in the BSM wave short message (WSM) header in the RV message.

RSS is measured by the HV and is measured by the vehicle communications system 20 upon receipt of each RV message. In embodiments having diversity antenna setups, two (2) RSS measurements may be captured (one for each antenna).

The azimuth angle is the angle at which the RV vehicle communications system 20-$n$ is located relative to an x-axis extending from the HV vehicle communications system 20 through the front of the vehicle 10 and is determined based on the angle of the RV relative to the HV vehicle boresight. The azimuth angle provides the HV with the location of the RV and is later used when sorting the messages into bins, if this option is enabled.

Figure 3:
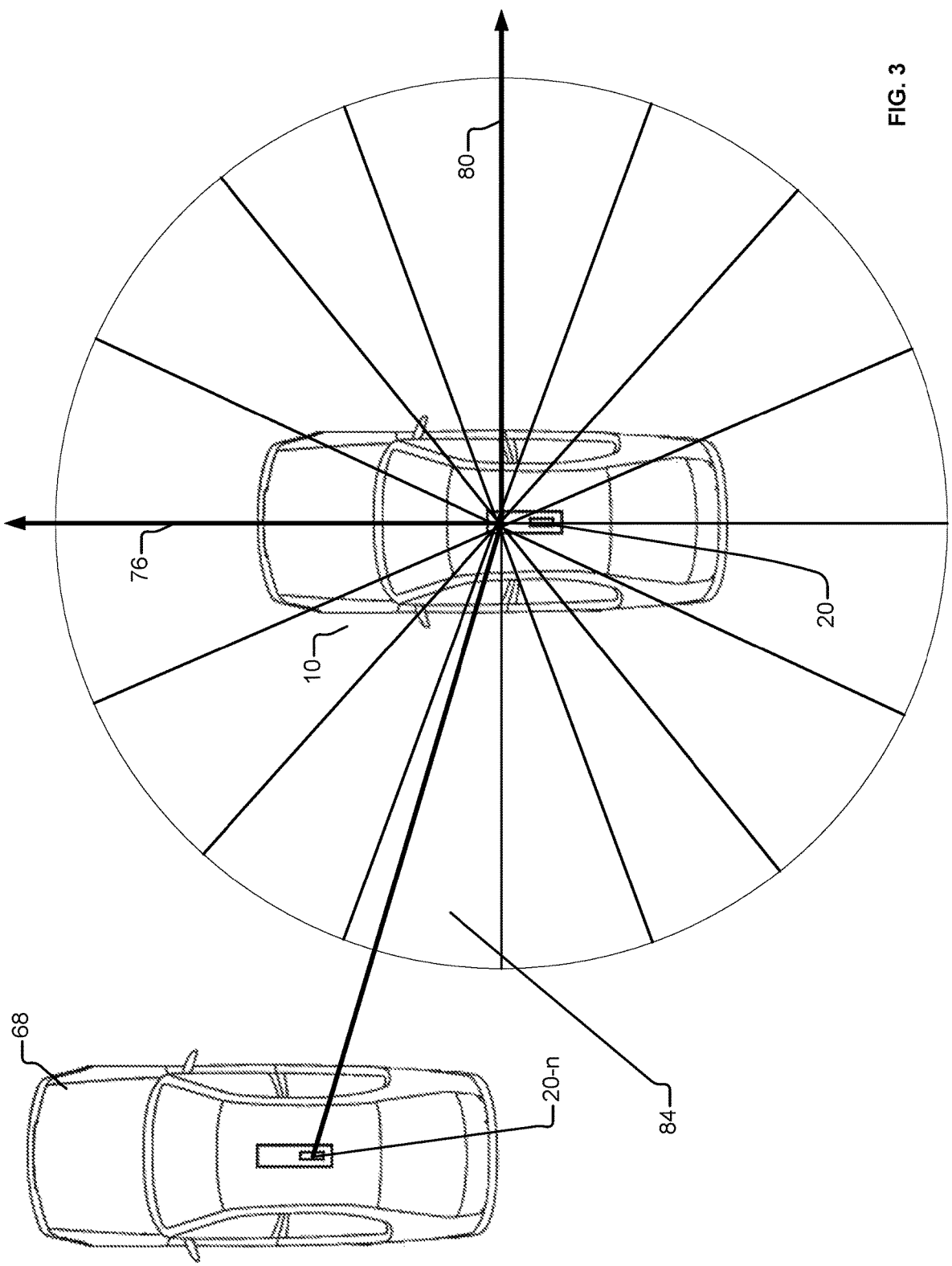
FIG. 3 is an illustration of a Society of Automotive Engineers (SAE) coordinate system and azimuth angles for a vehicle having a vehicle communications system according to the present teachings.

Referring additionally to FIG. 3, the azimuth angle is determined with reference to the SAE (Society of Automotive Engineers) coordinate system which places the positive x-axis along line 76 and the positive y-axis along line 80 with positive angular displacement moving clockwise from the positive x-axis 76 and negative angular displacement moving counter-clockwise from the positive x-axis 76. For example, the positive y-axis 80 is +90 degrees displaced from the positive x-axis 76, and the RV DSRC 20-$n$ is displaced at an azimuth angle of −72 degrees from the positive x-axis 76.

The data determination unit 52 communicates the transmit power, the RSS, and the azimuth angle to the message sorting unit 56. The message sorting unit 56 sorts the RV messages into "bins" defined by azimuth angle. While this feature is not necessary for diagnosis of the vehicle communications system 20, sorting the RV messages may enable the diagnostic system 40 to pinpoint the damage or obstruction on the antenna. Systems without the sorting feature enabled simply add the messages into a single "bin" for sampling.

Again, referring to FIG. 3, a plurality of "bins" may be defined for the 360 degree coverage of the vehicle 10. For example, 16 bins may be defined which each cover 22.5 degrees of the 360 degrees. In the example of FIG. 3, the RV vehicle communications system 20-$n$ is displaced at an azimuth angle of −72 degrees from the positive x-axis 76. As such, the RV message would be placed in the $4^{th}$ bin counter-clockwise from the positive x-axis 76 indicated at reference 84.

The message sorting unit 56 communicates the RV messages and bin information to the failure determination unit 60. The failure determination unit 60 moves bin to bin to determine failures and does not cross-compare between bins. The failure determination unit 60 determines a minimum acceptable RSS for each RV message in the respective bin.

As previously discussed, the transmit power is determined from each RV message and is therefore known for each RV message. When the RV sends a message at a particular transmit power, through development testing, the HV expects to receive the RV message at a particular respective signal strength. The failure determination unit 60 may be programmed with a table coordinating various transmit powers with expected RSS values. The failure determination unit 60 may look up the transmit power in the programmed table considering range to determine an expected RSS value. Alternatively, the failure determination unit 60 may calculate the expected RSS value through a series of equations which relate transmit powers with expected RSS values. In other embodiments, the diagnostic system 40 may account for elevation angle and azimuth angle in addition to transmit power and range to determine an RSS value.

If a minimum RSS is not available, the RV message may be discarded because the HV antenna may be designed to receive at the particular azimuth angle or optionally elevation angle and should not be used for diagnostics. If a minimum RSS value is available, the failure determination unit 60 compares the RSS values of each RV message to the minimum RSS value. If the RSS value of the RV message is less than the minimum RSS, a low RSS counter is incremented and a sample RSS counter is incremented, whereas if the RSS value of the RV message is at least equal to the minimum RSS, only the sample RSS counter is incremented.

When the sample RSS counter reaches a threshold number of samples, the failure determination unit 60 computes a ratio of low RSS samples to total samples. The threshold number of samples may be equal to, for example, 1000 samples. The threshold number of samples may be set to consider an average percentage of vehicles with vehicle communications systems and an average number of vehicles encountered for an average driver over the course of several days to a week. This ensures that the HV will communicate with a meaningful number of RVs such that there is a high confidence in the diagnostic system 40.

The failure determination unit 60 may also compare the ratio of low RSS samples to total samples to a threshold value. If the ratio is greater than the threshold value, the failure determination unit 60 will trigger a diagnostic output. The threshold value may be set at, for example, 0.5 or 50%. The threshold value may be set at a number that will not trigger a system failure based on several falsely failing messages.

The failure determination unit 60 triggers the diagnostic output in the communication unit 64. The communication unit 64 relays the diagnostic message to the vehicle interface 72. The diagnostic message may be presented as a display on an instrument panel, such as a message or indication light. The diagnostic message may also be communicated as an audible alarm or sent through electronic messaging to a driver's device. The communication unit 64 may provide details in the message such as the location of the obstruction or damage.

Figure 4:
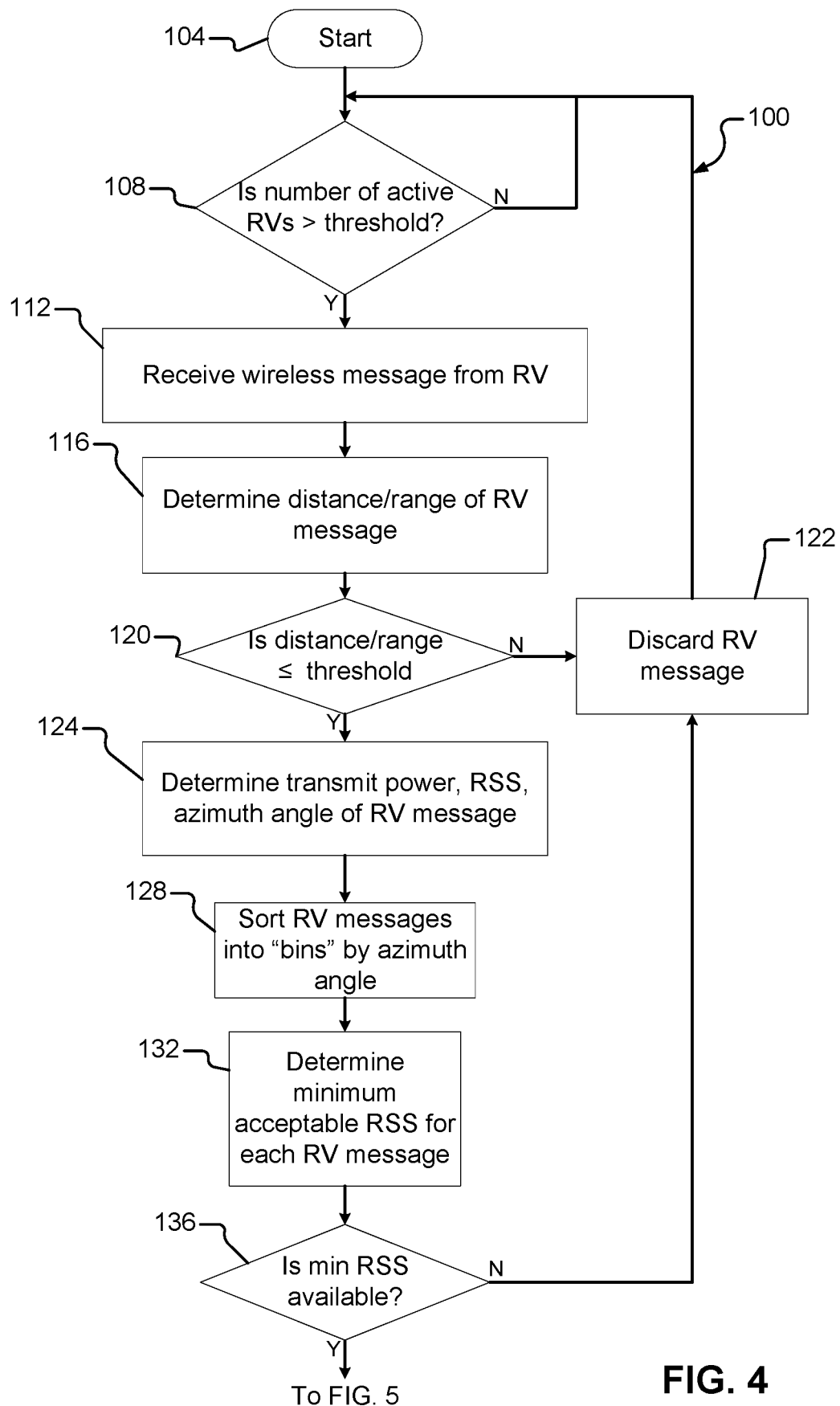
FIG. 4 is a flow chart for a method for determining the integrity of an antenna of a vehicle communication system according to the present teachings.
Figure 5:
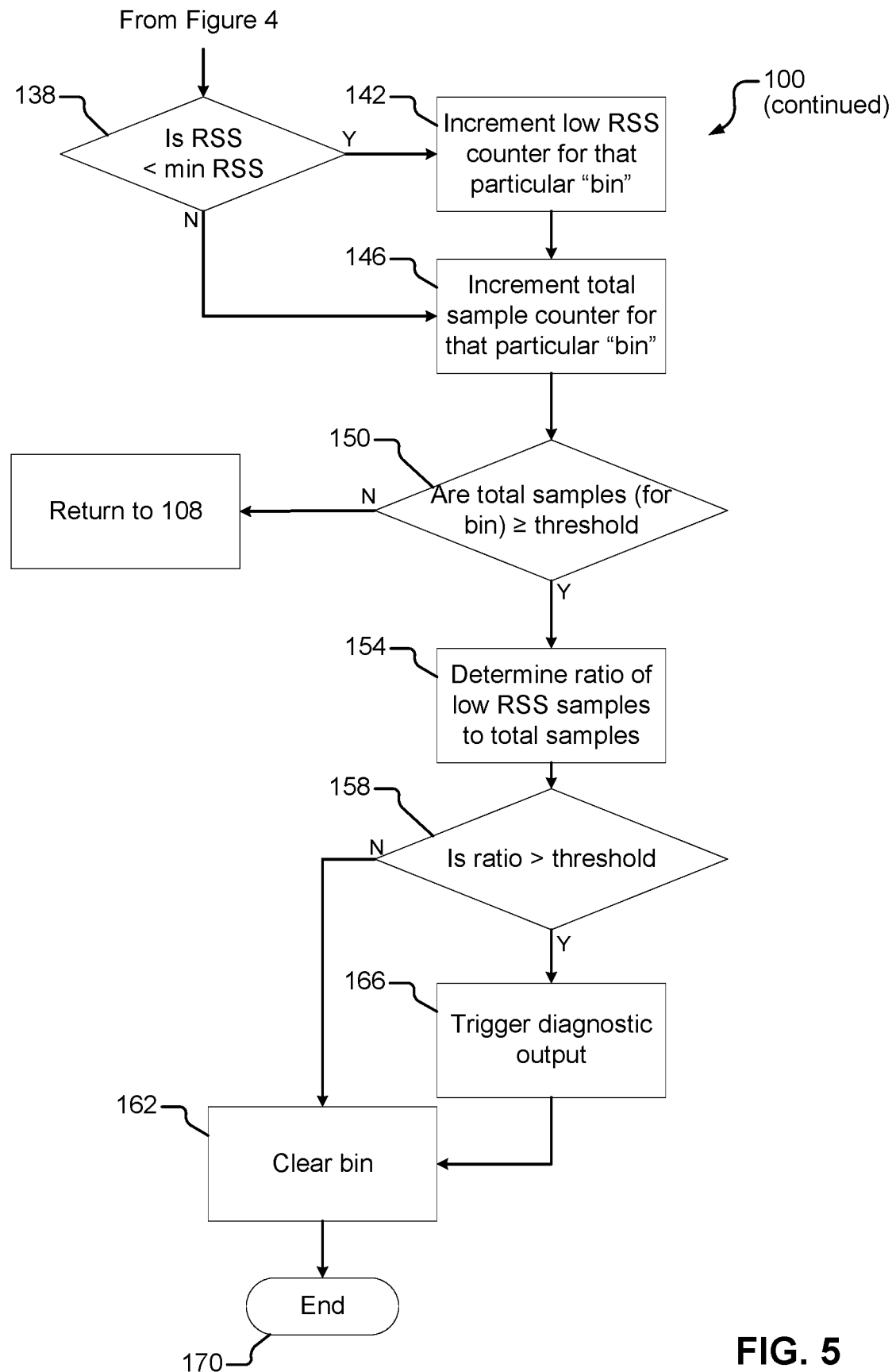
FIG. 5 is a continuation of the flow chart in FIG. 4.

A method 100 for determining the integrity of the antenna 24 of the vehicle communications system 20 is illustrated in FIGS. 4 and 5. Method 100 begins at 104. At 108, method 100 determines whether a number of active RVs exceeds a predetermined threshold. The number of active RVs is determined within a preset distance (for example only, 50 m) from the HV and is based on the number of messages (BSMs) received from different vehicles (or, in some embodiments, infrastructure, pedestrians, networks, etc.) within the targeted area (i.e., within the preset distance). The predetermined threshold may be set to a number, for example only, 5-10 vehicles, that represents a number of vehicles that ensures a variety of samples for confidence in the results and prevention of cyber-attacks. Additionally, the messages may be randomly sampled to ensure that all of the messages are not sent by a single vehicle (i.e., diversity of messages) and to prevent against cyber-attacks.

If false at 108, method 100 continues to monitor the number of RVs at 108. If true at 108, method 100 receives the wireless message from the RV 68 at 112. At 116, the method 100 determines a distance or range of the RV message. The distance or range is computed in meters by comparing the GPS coordinates of the RV 68 (provided in the message) with the GPS coordinates of the HV 10.

At 120, method 100 determines whether the distance or range of the RV message is within a threshold distance or range. For example only, the predetermined distance threshold may be 50 meters (m). The predetermined distance threshold may be set to a number that represents a distance with a high likelihood of being in direct line-of-sight. It is desirable to evaluate messages from RVs in direct line-of-sight because it filters out the likelihood of obstructions and false failures or triggers.

Some embodiments may utilize diversity antenna setups, as previously discussed. If the HV 10 utilizes diversity antennas and a distance between the antennas is greater than a diversity threshold (for example only, 3 meters), two different range values must be calculated because the low RSS measurements could differ between the two antennas.

In some embodiments, the method 100 may also filter messages based on elevation angle. Filtering based on elevation angle eliminates vehicles that may be positioned on a different road (for example an overpass or an underpass) or not within the line-of-sight. The elevation angle may be computed by comparing the GPS coordinates of the RV (provided in the message) with the GPS coordinates of the HV. In these embodiments, the method 100 compares the computed elevation angle with a predetermined threshold (for example only ±5 degrees) and discards messages with an elevation angle greater than the predetermined threshold.

If false at 120, method 100 discards the RV message at 122 and returns to 108. If true at 120, method 100 determines the transmit power, the RSS, and the azimuth angle for the RV message at 124. Transmit power is provided in the BSM wave short message (WSM) header in the RV message. RSS is measured by the vehicle communications system 20 for the HV 10 upon receipt of each RV message. The azimuth angle is the angle at which the RV vehicle communications system 20-n is located relative to an x-axis extending from the HV vehicle communications system 20 through the front of the vehicle 10 and is determined based on the angle of the RV relative to the HV vehicle boresight (see also FIG. 3). The azimuth angle provides the HV with the location of the RV and is later used when sorting the messages into bins, if this option is enabled.

At 128, if the option is enabled, method 100 sorts the RV messages into "bins" according to azimuth angle. A plurality of "bins" may be defined for the 360 degree coverage of the vehicle 10. For example, 16 bins may be defined which each cover 22.5 degrees of the 360 degrees (FIG. 3). In the example of FIG. 3, the RV vehicle communications system 20-n is displaced at an azimuth angle of −72 degrees from the positive x-axis 76. As such, the RV message would be placed in the $4^{th}$ bin counter-clockwise from the positive x-axis 76 indicated at reference 84.

While this feature is not necessary for diagnosis of the vehicle communications system 20, sorting the RV messages may enable the diagnostic system 40 to pinpoint the damage or obstruction on the antenna. Systems without the sorting feature enabled simply add the messages into a single "bin" for sampling.

At 132, method 100 determines the minimum acceptable RSS for the RV message. The minimum acceptable RSS may be the transmit power at which the vehicle communications system 20 expected to receive the RV message. Through development testing, the HV has an expected RSS for each transmit power and range that the HV may receive a message. The expected RSS may be contained in a lookup table corresponding to various transmit powers and ranges, or may be calculated from a stored equation.

In some embodiments where the elevation angle was not used to filter RV messages, the minimum RSS value may take into account the elevation angle of the RV. In still other embodiments, the method 100 may account for the azimuth angle in the minimum RSS.

At 136, the method 100 determines whether the minimum RSS is available for the RV message. If false, method 100 discards the RV message at 122 and returns to 108. If the minimum RSS is not available, the RV message may be discarded because the HV antenna may be designed to receive at the particular azimuth angle or optionally elevation angle and should not be used for diagnostics.

If true at 136, method 100 determines whether the RSS is less than the minimum RSS at 138 (FIG. 5). If true at 138, the method 100 increments a low RSS counter for the particular bin at 142 and increments a sample counter for the particular bin at 146. If false at 138, the method 100 increments the sample counter for the particular bin at 146.

At 150, method 100 determines whether the total number of samples for the bin is greater than a threshold. The threshold number of total samples may be equal to, for example, 1000 samples. The threshold number of samples may be set to consider an average percentage of vehicles with vehicle communications systems and an average number of vehicles encountered for an average driver over the course of several days to a week. This ensures that the HV will communicate with a meaningful number of RVs such that there is a high confidence in the diagnostic system 40.

If false at 150, method 100 returns to 108. If true at 150, method 100 determines the ratio of low RSS samples to total samples (i.e., low RSS samples/total samples) at 154. At 158, method 100 determines whether the ratio is greater than a predetermined threshold. The predetermined threshold may be set at, for example, 0.5 or 50%. The threshold value may be set at a number that is not likely to trigger a system failure based on several falsely failing messages (i.e., set to instill a high confidence in the results).

If false at 158, method 100 clears the bin at 162. If true at 158, method 100 triggers a diagnostic output at 166. The diagnostic output may be a message presented as a display on an instrument panel of the HV 10, such as a message or indication light. The diagnostic message may also be communicated as an audible alarm or sent through electronic messaging to a driver's device. In some embodiments, details may be included in the message, such as the location of the obstruction or damage.

At 162, method 100 clears the bin. At 170 the method 100 ends.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A communications system for a vehicle comprising:
   an antenna mounted on a vehicle and configured to communicate with a plurality of remote units; and
   a diagnostic controller, coupled to the antenna, configured to perform detecting of obstacles or damage to the antenna,
   wherein the diagnostic controller, coupled to the antenna, is configured to perform receiving remote messages sent from the plurality of remote units, measuring a receive signal strength of the remote messages, and determining a ratio of low receive signal strength sample messages to total sample messages, and
   the diagnostics controller triggers a diagnostic output to the vehicle when the ratio is greater than a predetermined threshold.

2. The communications system of claim 1, wherein the diagnostic controller includes a remote message receiving unit that determines a number of active remote units within a predetermined range based on global positioning system coordinates of the remote units transmitted through the remote messages.

3. The communications system of claim 1, wherein the diagnostic controller includes a remote message filter unit that discards the remote message if a range of the remote message is greater than a predetermined threshold, and a remote message receiving unit that determines the range of the remote message based on global positioning system coordinates of the remote unit transmitted through the remote message.

4. The communications system of claim 1, wherein the diagnostic controller includes a data determination unit that determines a transmit power, the receive signal strength, and an azimuth angle of the remote message and a message sorting unit that sorts the remote message into one of a plurality of bins representing a segment of 360 degrees surrounding the antenna.

5. The communications system of claim 1, wherein the diagnostics controller includes
   a data determination unit that determines the receive signal strength and a minimum receive signal strength for the remote message, and
   a failure determination unit that compares the receive signal strength with the minimum receive signal strength, increments the low receive signal strength sample messages if the receive signal strength is less than the minimum receive signal strength, and increments the total sample messages.

6. The communications system of claim 1, wherein the diagnostic output is at least one of a visual display, an audible alarm, and an electronic message.

7. The communications system of claim 1, wherein the remote message is a basic safety message.

8. A diagnostics system configured to detect obstacles or damage to a communications antenna on a vehicle, the diagnostics system comprising:
   a remote message receiving unit, coupled to the antenna, configured to perform receiving messages from a plurality of remote units;
   a data determination unit, coupled to the antenna, measuring a receive signal strength of each message and determining a ratio of low receive signal strength sample messages to total sample messages; and
   a failure determination unit, coupled to the antenna, triggering a diagnostic output when the ratio is greater than a predetermined threshold.

9. The diagnostics system of claim 8, wherein the remote message receiving unit is configured to determine a number of active remote units within a predetermined range based on global positioning system coordinates of the remote units transmitted through each message.

10. The diagnostics system of claim 8, further comprising a remote message filter unit configured to discard the message if a range of the message is greater than a predetermined threshold,
    wherein the remote message receiving unit is configured to determine the range of the message based on global positioning system coordinates of the remote unit transmitted through the message.

11. The diagnostics system of claim 8, wherein the data determination unit is configured to determine a transmit power, the receive signal strength, and an azimuth angle of the message and a message sorting unit is configured to sort the message into one of a plurality of bins representing a segment of 360 degrees surrounding a communication antenna.

12. The diagnostics system of claim 8, wherein the data determination unit is configured to determine the receive signal strength and a minimum receive signal strength for the message, and
    the failure determination unit is configured to compare the receive signal strength with the minimum receive signal strength, increment a low receive signal strength sample messages counter if the receive signal strength is less than the minimum receive signal strength, and increment a total sample messages counter.

13. The diagnostics system of claim 8, wherein the diagnostic output is at least one of a visual display, an audible alarm, and an electronic message.

14. The diagnostics system of claim 8, wherein the message is a basic safety message.

15. A method for determining an integrity of a communications antenna on a vehicle, the method comprising:
    receiving, by a remote message receiving unit, a remote message sent by a remote unit;
    measuring, by a data determination unit, a receive signal strength of the remote message;

determining, by a data determination unit, a ratio of low receive signal strength sample messages to total sample messages; and triggering, by a failure determination unit, a diagnostic output when the ratio is greater than a predetermined threshold.

16. The method of claim 15, further comprising determining, by the remote message receiving unit, a number of active remote units within a predetermined range based on global positioning system coordinates of the remote units transmitted through the remote messages.

17. The method of claim 15, further comprising discarding, by a remote message filter unit, the remote message if a range of the remote message is greater than a predetermined threshold; and determining, by the remote message receiving unit, the range of the remote message based on global positioning system coordinates of the remote unit transmitted through the remote message.

18. The method of claim 15, further comprising determining, by the data determination unit, a transmit power, the receive signal strength, and an azimuth angle of the remote message; and sorting, by a message sorting unit, the remote message into one of a plurality of bins representing a segment of 360 degrees surrounding the communication antenna.

19. The method of claim 15, further comprising determining, by the data determination unit, the receive signal strength and a minimum receive signal strength for the remote message;

comparing, by the failure determination unit, the receive signal strength with the minimum receive signal strength;

incrementing, by the failure determination unit, the low receive signal strength sample messages if the receive signal strength is less than the minimum receive signal strength; and incrementing, by the failure determination unit, the total sample messages.

20. The method of claim 15, further comprising triggering, by the failure determination unit, at least one of a visual display, an audible alarm, and an electronic message as the diagnostic output.

* * * * *

UNITED STATES PATENT AND TRADEMARK OFFICE
CERTIFICATE OF CORRECTION

PATENT NO. : 10,567,094 B2  
APPLICATION NO. : 15/922173  
DATED : February 18, 2020  
INVENTOR(S) : Joe Stinnett Page 1 of 1

It is certified that error appears in the above-identified patent and that said Letters Patent is hereby corrected as shown below:

In the Claims

Column 13, Line 64: In Claim 5, after "includes", insert --:--

Signed and Sealed this
Second Day of June, 2020

Andrei Iancu
*Director of the United States Patent and Trademark Office*